Inventor
ARTHUR C. HEEHLER

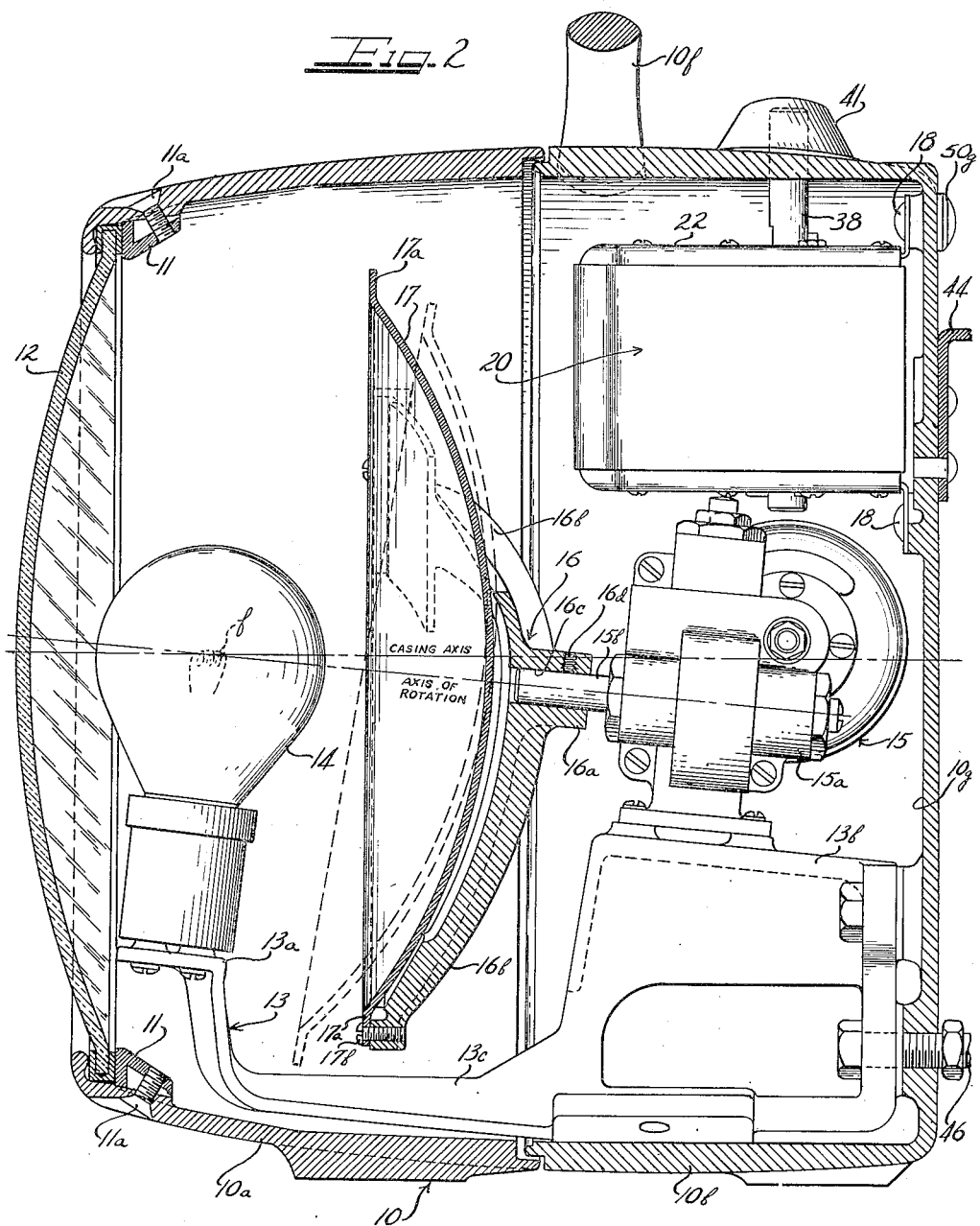

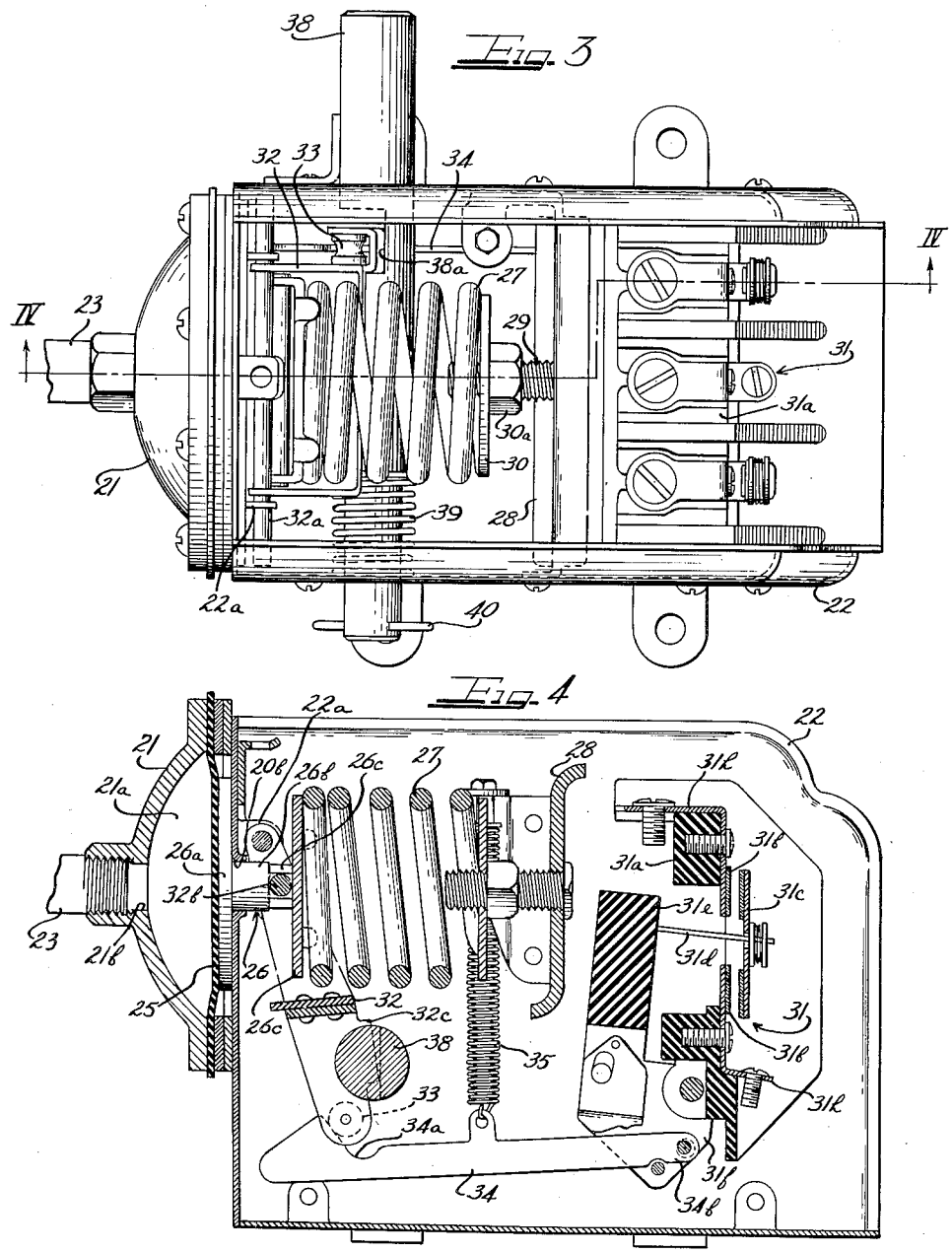

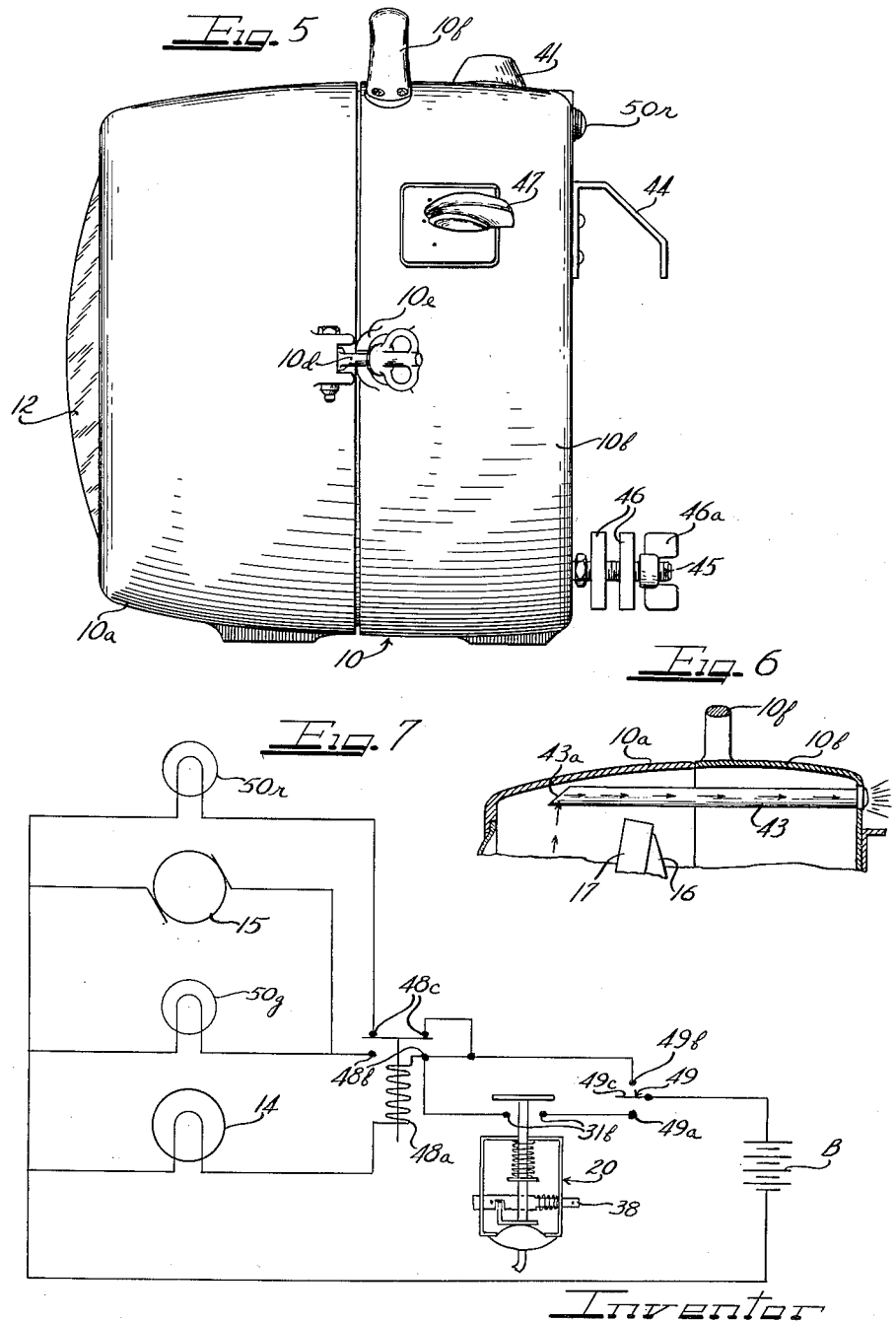

Patented Feb. 12, 1952

2,585,653

UNITED STATES PATENT OFFICE 2,585,653

MOUNTING STRUCTURE FOR WARNING AND SIGNALING ILLUMINATION APPARATUS

Arthur C. Heehler, Chicago, Ill., assignor to The Pyle National Company, Chicago, Ill., a corporation of New Jersey Application April 14, 1948, Serial No. 20,958

3 Claims. (Cl. 240—48)

This invention relates to a warning light construction and a control circuit therefor, and particularly to a warning light for use on a railroad train for providing a positive and reliable indication that the train carrying the warning light is slowing down or has stopped.

In recent years, there has been a decided trend in the railroad industry toward the adoption of warning light arrangements at both the front and rear ends of a train and constructed so as to project a wobbling beam of light respectively in front of and behind the train. Such warning light generally employed a beam of predominantly red colored rays which not only emphasized the warning nature of the signal but also improved the transmission distance of the signal under unfavorable atmospheric conditions.

The mechanisms heretofore employed for producing a wobbling or flashing of a warning light beam have not been entirely satisfactory, inasmuch as they have been expensive to produce and unreliable in operation, requiring frequent maintenance. Furthermore, existing warning light constructions have generally required that the lights be fixedly secured to either the front or rear end of the train and more or less permanent electrical and air pressure connections made thereto. This is a matter of inconvenience, for a warning light of this type should be readily portable and capable of being quickly mounted upon any car or engine of the train which may happen to be the front or rear car.

Accordingly, it is an object of this invention to provide an improved warning light construction and control circuit therefore which is particularly adaptable for use on railroad trains, street cars, busses or similar vehicles.

A further object of this invention is to provide an improved warning light construction wherein a wobbled beam of light is produced by rotation of a reflector relative to a light source about a rotative axis which is angularly disposed with respect to the light reflecting axis of the particular reflector, thus producing a wobbled beam following a conical path having unusual visibility characteristics.

Still another object of this invention is to provide a unitary warning light system for railroads wherein a single casing mounts all of the major elements of the light, including the light source, the rotating reflector for producing its wobbled beam, a pressure operated switch for producing actuation of the light in response to a predetermined decrease in the pressure of the train brake pressure system, plus any desired manual control switches. In this manner, a completely portable warning light construction is provided which may be conveniently assembled in a desired position upon any conventional railroad car or engine.

Still another object of this invention is to provide an improved control circuit for a railroad train warning light characterized by the automatic energization of the warning light upon a change in pressure of the train brake pressure system of a predetermined value, generally corresponding to the application of a braking effort sufficient to substantially slow down or stop the train.

As an additional object, this invention provides a manually resettable latch operating in conjunction with a pressure switch controlling the energization of the warning light in such manner that the reduction in pressure of the train brake pressure system to a predetermined extent will automatically lock the warning light in its energized condition and require a manual resetting operation before the warning light may again be de-energized.

The specific nature of the invention as well as other objects and advantages thereof will become apparent to those skilled in the art from the following detailed description of the annexed sheets of drawings, which, by way of preferred example only, illustrate one specific embodiment of the invention.

On the drawings:

Figure 2 is a sectional view taken on the plane II—II of Figure 1;

Figure 3 is an enlarged scale sectional view of the pressure responsive switch incorporated in the assemblage of Figures 1 and 2, showing in particular, the manually resettable latch;

Figure 4 is a sectional view taken on the plane IV—IV of Figure 3;

Figure 5 is a reduced scale side elevational view of the warning light of Figure 1;

Figure 6 is a reduced scale, partial, sectional view, similar to Figure 2, illustrating a warning light embodying a tell-tale indicator; and Figure 7 is a schematic view of a control circuit for a railroad warning light embodying this invention.

As shown on the drawings:

Figure 1:
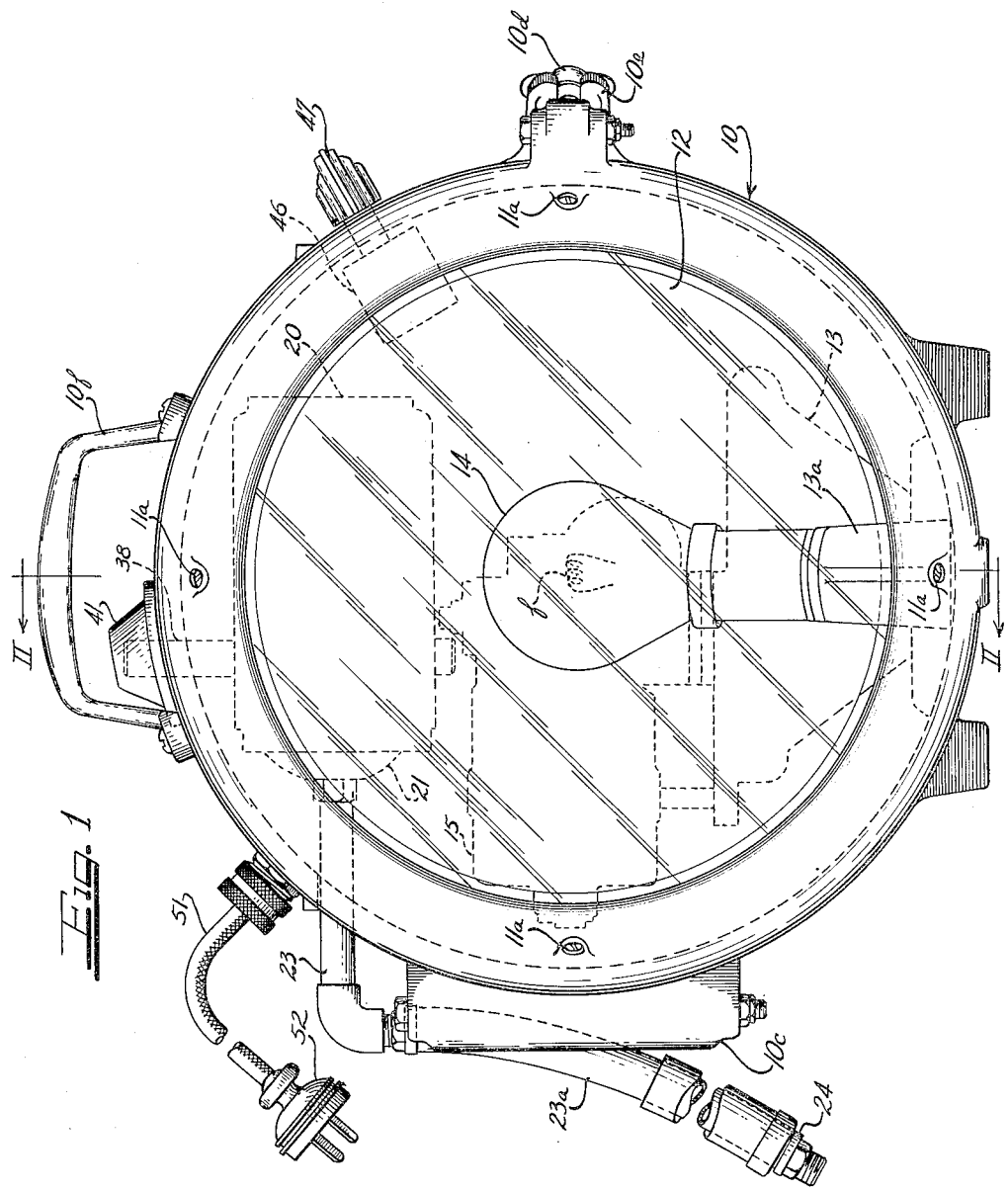
Figure 1 is a front elevational view of an assembled warning light unit embodying this invention.

Substantially all of the elements of a warning light embodying this invention are housed within a hollow closed casing 10. Such casing, which is of generally cylindrical configuration, may be conveniently defined by two cup-shaped half parts 10a and 10b which are pivoted together by cooperating hinges 10c and locked together in closed position by a tumble bolt clamp 10d mounted on one of the casing halves and cooperating with a bifurcated keeper 10e provided on the other casing half. A handle 10f is suitably secured to one of the casing halves 10b to permit the light unit to be conveniently transported.

The front wall of casing half 10a is apertured and a suitable light transmitting element is mounted therein, such as a circular lens 12. Lens 12 is peripherally clamped to the casing half 10a by circumferentially spaced brackets 11, which are in turn secured to the casing half 10a by a plurality of screws 11a.

Along the bottom interior wall of the casing 10 a bracket 13 is mounted in any convenient manner, such as by bolts which are threaded into suitable bosses provided in the rear wall 10g of the casing half 10b. Bracket 13 defines a front pedestal portion 13a located immediately adjacent to the inside surface of the lens 12 and a rear pedestal portion 13b disposed adjacent the casing rear wall 10g, and such pedestal portions are interconnected by an integral web portion 13c. On front pedestal portion 13a, a light socket is mounted and such socket in turn supports a suitable light bulb 14 with the filament of the bulb, indicated at f, disposed in substantial alignment with the central axis of the casing 10 and the lens 12. The rear pedestal portion 13b provides support for a suitable prime mover 15, which may conveniently comprise an electric motor driving an output shaft 15b through the medium of a gear reduction unit 15a. In any event, the output shaft 15b is located in the vertical central plane of the casing 10 and the axis of such shaft preferably substantially intersects the theoretical point source of rays emitted by bulb 15, hence intersects the light bulb filament f, but is angularly disposed with respect to the axis of the casing 10.

It should be particularly noted that through the utilization of a common support bracket 13 for both the light bulb 14 and the motor 15, the alignment of the axis of motor output shaft 15b with respect to the filament f is fixed and that the unit may be repeatedly disassembled and assembled for maintenance or repair purposes without incurring any alignment problems.

A reflector supporting spider 16 is rotated by output shaft 15b of the motor unit 15. Such spider comprises an integral casting having a hub portion 16a and a plurality of angularly spaced, radially extending arm portions 16b. Hub portion 16a is provided with a bore 16c to permit the mounting of the spider on the output shaft 15b and such bore is angularly eccentrically disposed relative to the peripheries of the arm portions 16b. Hence, when output shaft 15b is rotated by motor 15, the peripheries of the arm portions 16b of the spider 16 will move in a conically eccentric path with respect to the central axis of the casing 10.

A light reflecting disk 17 is then provided which is of generally circular peripheral configuration and which is preferably parabolicly formed, although it will be understood by those skilled in the art that other types of curved surfaces may be employed depending upon the specific beam characteristics desired to be produced by the reflector. The circular rim portion 17a of the reflector 17 is secured to the peripheries of the spider arms 16b by suitable screws 17b. It is therefore apparent that the reflecting axis of the reflector 17 will be angularly disposed relative to its axis of rotation provided by the output shaft 15b. As a result, the reflector will cyclically shift in position relative to the light source f and a wobbled beam will be projected outwardly through lens 12, such beam being wobbled over a generally conical path. To facilitate the initial adjustment of the location of the filament f of the light bulb 15 with respect to the focal point of reflector 17, the reflector supporting spider 16 is axially adjustable on the motor output shaft 15b and may be secured in any desired position by a set screw 16d. In this manner, accurate focusing of the reflected beam may be conveniently produced.

From the construction thus far described, it is apparent that a flashing warning signal may be produced by concurrent energization of the light bulb 14 and the motor unit 15. If a red colored signal is desired, such may be obtained either by employing a red colored light bulb, or, preferably, by appropriately tinting the lens 12.

To improve the adaptibility of the warning light to railway operations, I prefer to incorporate several additional control mechanisms within the casing 10 so as to provide a single unit embodying both the light structure and the control elements therefore which may be conveniently transported and shifted from car to car. Accordingly, a pressure switch unit 20 is mounted within the casing 10. Such device is preferably mounted to the back wall 10g of the casing half 10b by suitable bolts 18 and is disposed so that a reset plunger 38 (to be described later) projects upwardly through a suitable aperture in the top portion of the casing half 10b.

Referring particularly to Figs. 3 and 4, the pressure switch unit is seen to comprise a housing 22 which has a pressure chamber casting 21 secured to one end thereof. Casting 21 defines an open mouth pressure chamber 21a and an inlet port 21b communicating therewith. A suitable pipe 23 is threadably secured to the inlet port 21b and projects outwardly of the light casing 10 where it is secured to a flexible conduit 23a having at the other end thereof a conventional fitting 24 by which the conduit 23 may be tapped into the brake pressure system of the train or car upon which the light is mounted.

A diaphragm 25 is mounted across the open end of pressure chamber 21a and is clamped between the peripheral rim of pressure chamber casting 21 and annular spacer members which abut the end wall of the pressure switch housing 22. A piston 26 is provided having an enlarged head portion 26a abutting the diaphragm 25 and a cylindrical stem portion 26b projecting through a suitable bearing aperture 20b formed in the adjacent wall of pressure switch housing 20. Hence, upon the connection of the conduit 23 into the brake pressure system of the train, the piston 26 will be urged by the diaphragm 25 to the position shown in Figure 4 wherein it abuts the adjacent wall of the pressure switch housing 22.

The piston 26 is spring-urged in the opposite direction by a compression spring 27 which operates against a circular plate 26c suitably secured to the inwardly projecting bifurcated end 26d of the piston stem 26b. A spring abutment plate 28 is suitably secured between opposed side walls of the pressure switch housing 20. For adjustment purposes, a stud 29 is threadably secured in the abutment plate 28 and a circular spring seat plate 30 is adjustably positioned on the stud 29 by a nut 30a. In this manner, the effective pressure exerted by the spring 27 against the piston 26 in opposition to the pressure forces on the diaphragm 25 may be conveniently adjusted.

In that portion of the pressure switch housing 22 lying on the opposite side of the abutment plate 28, an electrical switch unit 31 is mounted. Such unit comprises an insulating support 31a on which are suitably mounted a pair of fixed contacts 31b. A movable bridging contact 31c is provided which is actuated by a rod 31d which is suitably secured to a block 31e of insulating material, which in turn is mounted upon a plate 31f which is pivoted to the insulating support 31a. Obviously, clockwise pivotal movement of the plate 31f will raise the movable contacts 31c out of bridging relationship with fixed contacts 31b, while counterclockwise pivotal movement of the plate 31f will shift the movable contacts 31c into bridging engagement with the fixed contacts 31b.

The specific mechanism by which the pivotal movement of the plate 31f is produced in response to changes in the pressure forces exerted upon the diaphragm 25 forms no part of this invention and any conventional snap acting linkage may be employed. For example, a primary link 32 may be provided having one end thereof pivotally secured to a bracket 22a which is fixed to the side wall of pressure switch housing 22. Primary link 32 carries a transverse pin 32b which projects between the bifurcated end portion 26c of the piston stem 26b. Hence pressure induced movements of the piston 26 produced pivotal movements of the primary link 32. The free end of primary link 32 journals a roller 33 which cooperates with a cam surface 34a formed on one end of a secondary link 34. The other end 34b of link 34 is pivoted to the actuating plate 31f while the central portion thereof has a biasing spring 35 secured thereto which continuously urges the cam surface 34a of secondary link 34 in engagement with the roller 33. A person skilled in this art will recognize that the switch actuating linkage heretofore described will function to produce a snap action closing of the fixed contacts 31b by bridging contacts 31c upon a predetermined decrease in the pressure force exerted upon the diaphragm 25, hence in response to a predetermined decrease in the pressure of the brake pressure system of the train. When normal pressure is restored, the bridging contacts 31c will be shifted out of engagement with the fixed contacts 31b. Suitable terminal strips 31h are of course provided to permit electrical connections to be conveniently made to each of the fixed contacts 31b.

In accordance with this invention, a manually resettable latch plunger 38 is provided which cooperates in a unique manner with the pressure switch unit heretofore described. Latch plunger 38 may conveniently comprise a solid or tubular rod which is slidably journaled in aligned apertures provided in two opposed side walls of the pressure switch housing 22. Plunger 38 is located relative to one of the moving parts of the electric switch operating linkage so as to intersect the path of movement of such moving part, for example, the primary link 32. According to one operating procedure, the function of the plunger 38 is to freely permit clockwise movements of the primary link 32 through a range corresponding to the normal pressure variations upon the diaphragm 25 which are produced by normal braking and stopping of the train. Upon an emergency application of the brakes, wherein the pressure on the diaphragm 25 is reduced to a much greater extent, or upon a failure of the brake pressure system, the primary link 32 will move clockwise a greater distance, such movement of course resulting from the constant bias maintained by the spring 27. The contacts will, of course, be closed to energize the warning light. Upon the occurrence of such emergency conditions, it is the function of the latch plunger 38 to retain the primary link 32 in such extreme position irrespective of the restoration of full brake system pressure upon the diaphragm 25. It is then necessary that the latch plunger 38 be manually reset to its normal position to de-energize the warning light.

It is thus assured that the warning light will be energized upon the occurrence of an emergency on the train and will remain energized until normal braking system pressure is restored and a trainman manually resets the latch plunger 38.

According to an alternative procedure, the plunger 38 may be employed to lock the pressure switch unit 29 in its closed contact position upon any reduction in brake system pressure sufficient to produce a substantial slowing or stoppage of the train. Then every time that the train slows down or stops it will be protected by the warning light.

To accomplish the foregoing functions, the latch plunger 38 is provided with a notch portion 38a which normally receives an upstanding lip 32c of the primary link in inserted relationship. Latch plunger 38 is biased axially by a spring 39 which operates between an integral shoulder on the latch plunger and one of the side walls of the pressure switch housing 22. A cotter pin or other suitable transverse pin 40 is mounted in the outer end of the latch plunger 38 to limit the axial movement of the plunger 38 under the influence of the spring 39.

The depth of the notch 38a is so proportioned relative to the movements of the primary link 32 so that upon the occurrence of a predetermined reduction of the brake system pressure, the primary link 32 will shift sufficiently to remove the lip 32c from engagement in the notch 38a, and thereupon the latch plunger 38 will shift axially under the influence of the spring 39 and bring an un-notched portion of its surface into overlying relationship with respect to the lip 32c. Hence the primary link 32 is prevented from returning to its normal position upon the restoration of pressure to the braking system. It therefore follows that the contacts of the switch unit 31 will not only be closed upon the occurrence of a predetermined reduction in pressure of the braking system, but will be maintained in such closed position until the pressure is restored and the latch plunger 38 is manually shifted to restore the notch 38a to its position of alignment with respect to the link lip 32c.

As was previously mentioned, the one end of latch plunger 38 projects out of a light casing 10 to facilitate manual resetting operations. To protect such protecting end from inadvertent contacts and chance blows, an annular hub 41 is suitably secured to the exterior of casing half 10b and such surrounds the projecting end of latch plunger 38.

It is of course contemplated that the warning light embodying this invention will be used for daytime operations as well as during the night. In daytime operations, it often happens that the warning signal will be clearly visible to a person standing in front of the lens 12 but a person standing behind the light casing 10 could not readily ascertain whether the signal is properly operating. This is a source of annoyance to the brakeman at the rear end of the train who must either move to a position behind the train to observe whether the warning light is properly functioning or lean out over the warning light in a precarious position to ascertain such fact. As will be later described, the warning light control circuit embodying this invention includes certain indicating lights for remotely indicating the condition of energization of the warning light. Such arrangement, of course, provides an indication of the energization of the warning light only to those persons stationed in the vicinity of the indicating lights.

To provide a positive indication on the rear side of the warning light itself as to the operating condition of the light, a pair of red and green indicating lights 50r and 50g are mounted on the rear wall of the casing 10 and are selectively energized by a control circuit to be described, so as to indicate the operating condition of the bulb 14. A modified form of this invention illustrated schematically in Fig. 6, employs a light transmitting rod 43 to provide the tell-tale indication. Such rod is mounted in casing 10 in any convenient manner so that the rear end thereof projects out through the rear of the casing 10 and the front end is disposed in overlying relationship to the light bulb 15. This front end is then provided with an angularly disposed planar surface 43a. The rod 43 is formed of a suitable plastic or quartz exhibiting "edge lighting" characteristics. With such materials, light rays impinging upon the inner end of the rod 43 will be reflected by the angularly disposed planar surface 43a and transmitted along the length of the rod rearwardly out of the casing 10 in the manner indicated by the arrows in Figure 7.

As is best shown in Figure 5, suitable mounting arrangements are provided on the rear face of the warning light casing 10 so as to permit the warning light to be permanently or temporarily mounted in a desired position upon an engine or car of a train. Such mounting arrangement may comprise a generally U-shaped bracket 44 rigidly secured to the back wall 10g of the casing half 10b near the top thereof and a rearwardly projecting bolt 45 disposed near the bottom of the casing 10 and carrying a pair of clamping washers 46 and a thumb screw type clamp 46a threaded thereon.

As will be presently brought out, the preferred control circuit for the aforedescribed warning light embodies a relay and a manually operable switch. Such switch and relay unit may be also conveniently mounted in and upon the casing 10 and has been shown schematically at 46. The operating knob 47 for the switch of this assembly is of course disposed on the exterior of the casing 10.

Referring now particularly to Figure 7, there is disclosed a preferred form of warning light control circuit embodying this invention. In this circuit, the light source of the warning light unit has been designated by the numeral 14 while the driving motor is indicated at 15. The pressure responsive switch has been indicated in schematic form and designated as 20 and includes, of course, the manually operable reset plunger 38. The relay forming part of the combined relay and switch unit 46 has been indicated schematically at 48 and is of the well known type having an energizing coil 48a and two sets of contacts 48b and 48c, which are respectively normally open and normally closed. The switch forming part of the combined relay of switch unit 46 is indicated at 49 and is of the single pole double throw variety. A pair of indicating lamps 50r and 50g are provided which may be respectively of red and green color to indicate operating conditions of the warning light.

The various elements heretofore mentioned are assembled in a circuit for energization from the normal power system of the train represented by the battery B. It will be noted that the warning light 14 is connected in series circuit relationship with the coil 48a of the relay. The coil 48a is in turn connected in series circuit relationship with the contacts 31b of the pressure switch 20 and one of the contacts 49a of the switch 49. The relay coil 48a is also directly connected to the other contact 49b of the manual switch 49. The motor 15 and the green indicating light 50g are energized through the normally open contacts 48b of relay 48 while the red indicating light 50r is energized through the normally closed contacts 48c of the relay 48.

When the blade 49c of switch 49 is in engagement with contact 49a, the unit is set for automatic operation, i. e., energization of the warning light will be produced responsive to the closing of the contacts of the pressure switch 20, hence in response to the pressure variations in the brake pressure system of the train. As was heretofore pointed out, in the event of an emergency application of the brakes, or any other predetermined decrease in pressure of the brake system, the contacts of the pressure switch unit 20 are not only closed but are latched in closed position by the operation of latching plunger 38. The contacts remain in this condition until the pressure is restored to the brake pressure system and the latch plunger 38 is manually reset. Upon the closure of the contacts of the pressure switch 20, the relay coil 48a is energized and concurrently, the warning light bulb 14. Energization of the relay coil 48a effects the closure of contacts 48b and hence the energization of the reflector driving motor 15 and the green indicating light 50g. Concurrently, the red indicating light 50r is de-energized. Any failure in the power supply circuit to the warning light bulb 14, or the burning out of such light, immediately de-energizes the relay coil 48a and returns the circuit to the condition shown in Figure 7 wherein the red indicating light 50r immediately indicates the existence of a defect in the circuit.

When the blade 49c of switch 49 is in its neutral position or in engagement with contact 49b, then the warning light system operates entirely under manual control and independently of the pressure switch 20. Engagement of the switch blade 49c with contact 49b produces energization of the warning light 14 and the relay coil 48a, hence energizing the reflector motor 15 and the green indicating light 50g. Return of the switch blade 49c to its neutral position completely de-energizes the entire circuit. In the event of the failure of the warning light 14, the relay coil 48a is de-energized and hence the red indicating light 50r is energized to indicate such failure.

Electrical connections to the elements housed in casing 10 may be accomplished by a conventional cord 51 and plug 52.

From the foregoing description it is apparent that the warning light construction and control circuit embodying this invention provides an unusually efficient and adaptable unit for railroad warning use. The simplified design of the warning light not only permits the economical manufacture of the unit but the ruggedness of the components insures a long service life, free from maintenance problems. In the event that maintenance or repair is required, the utilization of a single bracket for supporting both the rotating reflector and the light source completely eliminates any problem of re-alignment of the reflector with respect to such light source. The control circuit described herein provides reliable and accurate operation of the warning light in response to predetermined conditions of pressure in the brake pressure system of the train. Any defect in the electrical circuit or failure of the light source of the warning light is promptly and accurately indicated. Lastly, the provision of a positive latch for effecting the continuous energization of the warning light upon the occurrence of an emergency condition or a predetermined brake pressure reduction insures that a warning signal will be produced when most needed and will remain effective until deliberately de-energized by the manual resetting of the latching plunger.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. In a warning light, the improvement of a sub-assembly adapted to be inserted in the casing structure of an oscillating warning light comprising, a unitary bracket having spaced front and rear pedestal portions, a light source on said front pedestal portion, a motor mounted on said rear pedestal portion and having an output shaft extending toward said front pedestal portion, a reflector secured on said output shaft of said motor in beam projecting relationship with the light source, the axis of said reflector being angularly disposed relative to the axis of rotation of said output shaft, whereby a moving pattern of light is reflected past said light source, and means provided on said bracket adapted to place said bracket in firm assembly with a lighting fixture casing.

2. A warning light assemblage, comprising, a casing, a translucent element in one wall of said casing, a unitary bracket having spaced front and rear pedestal portions, a light source on said front pedestal portion, a motor mounted on said rear pedestal portion and having an output shaft extending toward said front pedestal portion, a reflector secured on said output shaft of said motor in beam projecting relationship with said light source, the axis of said reflector being angularly disposed relative to the axis of rotation of said output shaft, whereby a moving pattern of light is reflected past said light source, said unitary bracket and the components mounted thereon being inserted in said casing with said light source adjacent said translucent element, and means mounting said bracket in firm assembly with said casing.

3. A warning light assemblage comprising, a casing having an open end, a unitary bracket having spaced-apart pedestal portions, a light source mounted on one of said pedestal portions, a motor mounted on the other of said pedestal portions, said motor having an output shaft disposed with the axis thereof intersecting the theoretical light point source of the light source, a parabolic reflector on said output shaft of said motor, the axis of said reflector being angularly disposed relative to the axis of said output shaft, adjustable locking means securing said reflector in co-rotatable assembly with said shaft, said reflector being axially shiftable on said shaft to relatively align said light source and the focal point of said parabolic reflector, said unitary bracket and the components assembled thereon being inserted in said casing with said light source adjacent said open end of said casing, and means to secure said bracket in firm assembly with said casing.

ARTHUR C. HEEHLER.

REFERENCES CITED

The following references are of record in the file of this patent:

UNITED STATES PATENTS

| Number | Name | Date |
|---|---|---|
| 1,548,958 | Sperry | Aug. 11, 1925 |
| 1,960,766 | Wells | May 29, 1934 |
| 2,261,222 | Buell | Nov. 4, 1941 |
| 2,374,408 | Braidwood | Apr. 24, 1945 |
| 2,446,333 | Kennelly | Aug. 3, 1948 |
| 2,456,286 | Kennelly | Dec. 14, 1948 |
| 2,487,591 | Ricci | Nov. 8, 1949 |

FOREIGN PATENTS

| Number | Country | Date |
|---|---|---|
| 6,349 | England | of 1896 |
| 77,671 | Austria | Aug. 11, 1919 |